United States Patent
Rathi et al.

(10) Patent No.: US 8,639,853 B2
(45) Date of Patent: Jan. 28, 2014

(54) PROGRAMMABLE WAVEFORM TECHNOLOGY FOR INTERFACING TO DISPARATE DEVICES

(75) Inventors: Aditya K. Rathi, Austin, TX (US); Eric L. Singer, Austin, TX (US); Caleb G. Wells, Austin, TX (US); Yiqi Jiang, Austin, TX (US)

(73) Assignee: National Intruments Corporation, Austin, TX (US)

( * ) Notice: Subject to any disclaimer, the term of this patent is extended or adjusted under 35 U.S.C. 154(b) by 236 days.

(21) Appl. No.: 13/192,989

(22) Filed: Jul. 28, 2011

(65) Prior Publication Data

US 2013/0031276 A1     Jan. 31, 2013

(51) Int. Cl.
*G06F 3/00* (2006.01)
*G06F 13/00* (2006.01)

(52) U.S. Cl.
USPC .................. 710/8; 710/2; 710/5; 710/32

(58) Field of Classification Search
None
See application file for complete search history.

(56) References Cited

U.S. PATENT DOCUMENTS

| | | | |
|---|---|---|---|
| 6,335,951 B1 | 1/2002 | Cangiani et al. | |
| 6,937,489 B2 | 8/2005 | Hsieh et al. | |
| 7,050,000 B2 | 5/2006 | Weals et al. | |
| 7,158,412 B2 | 1/2007 | Rodgers et al. | |
| 7,170,697 B2 | 1/2007 | Pate et al. | |
| 7,402,963 B2 | 7/2008 | Sliski et al. | |
| 7,483,748 B2 | 1/2009 | Torgerson et al. | |
| 7,502,264 B2 | 3/2009 | Rodgers et al. | |
| 7,616,454 B2 | 11/2009 | Yang | |
| 7,626,347 B2 | 12/2009 | Sliski et al. | |
| 2008/0114255 A1* | 5/2008 | Schwartz et al. | 600/474 |
| 2012/0159534 A1* | 6/2012 | Quan et al. | 725/31 |

OTHER PUBLICATIONS

Freescale Semiconductor, "Chapter 1: Serial Peripheral Interface (SPIV3) Block Description", Block Guide, V3.06, Jun. 2005, 22 pages.
National Instruments, SPI Digital Waveform Reference Library—Developer Zone, May 12, 2011, http://zone.ni.com/devzone/cda/epd/p/id/6163, 6 pages. [Retrieved Jun. 2, 2011].

* cited by examiner

*Primary Examiner* — Scott Sun
(74) *Attorney, Agent, or Firm* — Meyertons Hood Kivlin Kowert & Goetzel, P.C.; Jeffrey C. Hood (57) ABSTRACT

Various embodiments of a system, method, and memory-medium provide for configuration of a programmable waveform that allows for communication with one of a plurality of different target devices. The programmable waveform comprises one or more waveform parameters and one or more waveform lines. The waveform lines may comprise control lines and/or data lines. One or more of the waveform parameters may be set in response to user input, and corresponding signals based on the waveform lines may be generated in order to communicate with a target device selected from a variety of different possible target devices. Waveform parameters may include one or more of: setup time, hold time, lead time, trail time, idle time, clock frequency, clock duty cycle, number of data bits per transmission, number of data lines, pulse width, polarity, and phase.

20 Claims, 10 Drawing Sheets

Prior Art

FIG. 5b

Prior Art

PROGRAMMABLE WAVEFORM TECHNOLOGY FOR INTERFACING TO DISPARATE DEVICES

FIELD OF THE INVENTION

The present invention relates to configuring communication interfaces, and more particularly to configuring a single device to communicate with disparate target devices.

DESCRIPTION OF THE RELATED ART

Communication interfaces between devices are highly varied, and specific device models often have unique timing requirements. For example, analog to digital converter (ADC) devices may require control lines in their communication interface, to signal when a conversion should trigger, or to indicate when data from a finished conversion becomes available. The timing of control signals relative to each other and relative to data signals varies between devices. For example, an idle time period may be required from the point in time a conversion is completed and the point in time a trigger signal for the next conversion is asserted. As another example, a delay may be required before reading conversion data after a data-ready signal has been asserted to indicate that the conversion data is available.

Devices may also utilize a common communication protocol to transfer data, such as the serial peripheral interface (SPI) protocol. For example, an ADC may use control lines to carry signals used to trigger conversions while using the SPI protocol to transfer conversion data to another device. Consequently, the timing requirements must be met for all the communication lines used by the ADC.

The serial peripheral interface is a master-slave interface widely used in embedded systems, sensors, and other applications because of its simple hardware interfacing, protocol flexibility, and low pin count requirement. There is no single SPI standard, and devices are built with many different configurations. The SPI is a full-duplex interface, meaning that data may be sent in both directions during a transfer. The SPI features four signals that perform well-defined functions. The serial clock (SCLK) signal is generated by the SPI master device, and its edges indicate when data should be transferred. The chip select (CS) line is used by a master device to select a slave device for a given transmission. The master-out-slave-in (MOSI) and master-in-slave-out (MISO) lines carry data transferred between master and slave devices.

Because the SPI standard is flexible, there are many variations of the SPI protocol, with varying numbers of bits per transfer and varying clock configurations. Many microcontroller devices have configurable SPI controllers which may be programmed to one of four SPI modes (corresponding to four possible combinations of clock phase (CPHA) and clock polarity (CPOL)). Various clock frequencies are also supported. Some SPI variations include a single bi-directional data line for both MOSI and MISO data, some include respective separate lines for MOSI and MISO, while other variations include several MOSI and several MISO lines. As previously mentioned, there may be other control lines with additional timing requirements when interfacing an SPI device, such as other ADC lines. If this is the case, complicated "bit banging" software is required to drive communication using general purpose input/output (GPIO) ports, or the timing configurations must be programmed into a programmable hardware element. Both methods can be time consuming, often using valuable processing time, and/or requiring programmable hardware blocks in a system. But without such programming, SPI devices with disparate configurations are simply unable to communicate.

The SPI has been used as an example, but the concept of configuring timing parameters to communicate with disparate devices applies to all types of communication interfaces. Other examples of communication interfaces for communicating with differing devices include the Inter-Integrated Circuit ($I^2C$) protocol, and the Joint Test Action Group (JTAG) protocol. A method for quick configuration of a single device to communicate with many different target devices is desirable.

SUMMARY OF THE INVENTION

Various embodiments of a system, method, and memory-medium provide a configurable, programmable waveform that allows for communication with a plurality of different target devices. The configurable, programmable waveform includes one or more waveform parameters and one or more waveform lines. The waveform lines may include control lines and/or data lines. One or more of the waveform parameters may be set in response to user input, and corresponding signals based on the waveform lines may be generated in order to communicate with a specified target device from a variety of different possible target devices.

In other embodiments, only a subset of the programmable waveform lines may be selected for generation of corresponding signals. In some embodiments, the waveform lines may represent a serial peripheral interface (SPI). One or more of the waveform control lines may be configurable for communication with an analog to digital converter.

Waveform parameters may include one or more of: setup time, hold time, lead time, trail time, idle time, clock frequency, clock duty cycle, number of data bits per transmission, number of data lines, pulse width, polarity, and phase. In one set of embodiments, parameters may be set using a graphical user interface (GUI), and the appearance of the waveform displayed to the user may change in response to the parameters set by the user. In some embodiments, the programmable waveform may be selected from a database of available programmable waveforms.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Unit Under Test (UUT)—A physical device or component that is being tested.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that may be used to program or configure a programmable hardware element.

Graphical User Interface—this term is intended to have the full breadth of its ordinary meaning. The term "graphical user interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window, panel, or dialog box having one or more GUI Elements, or may include a plurality of individual GUI Elements (or individual windows each having one or more GUI Elements), wherein the individual GUI Elements or windows may optionally be tiled together.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Overview of Exemplary Test System

Figure 1:
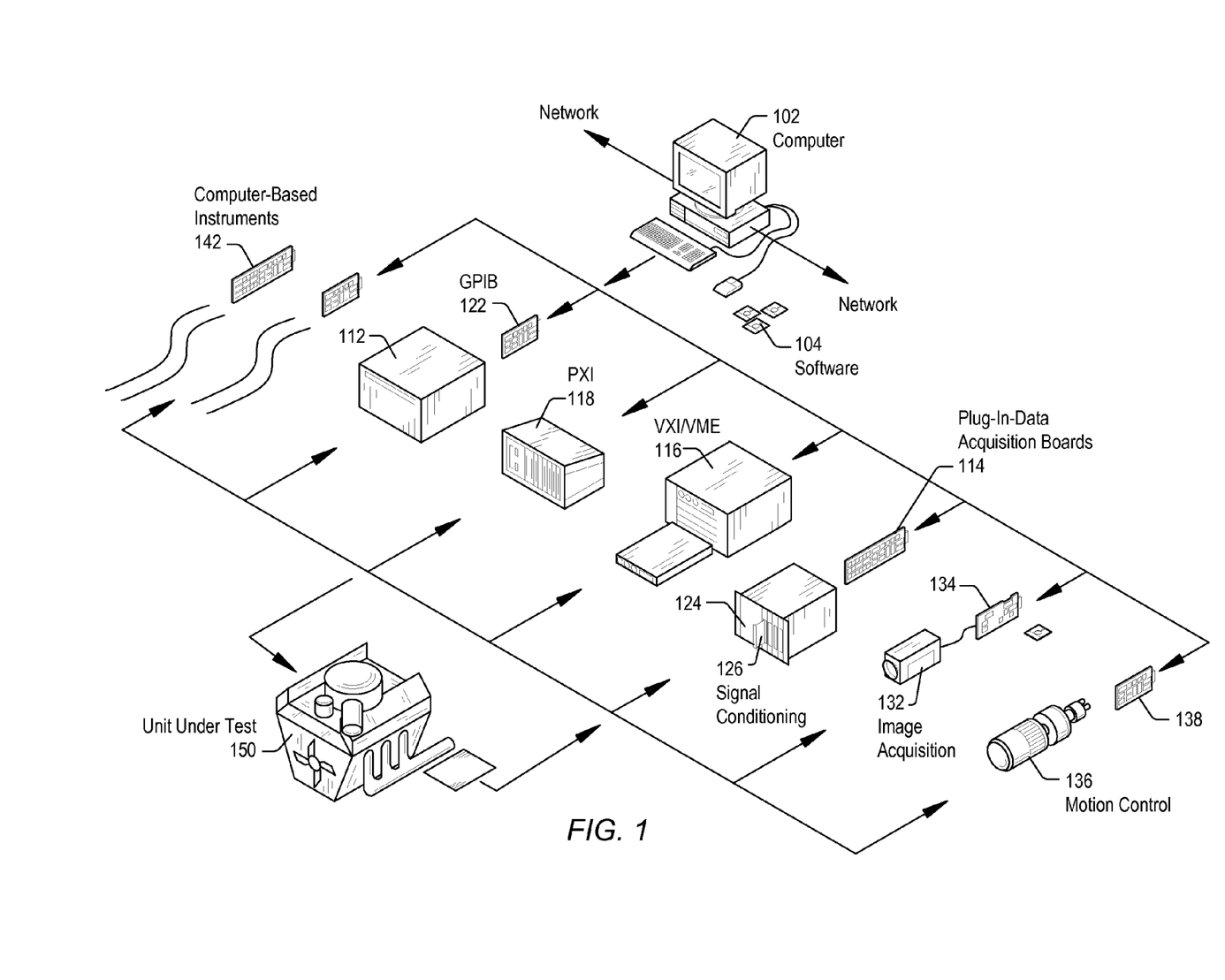
FIG. 1 illustrates an exemplary automated test system according to one embodiment.

FIG. 1 illustrates an exemplary automated test system 100, according to one embodiment. It is noted that FIG. 1 is exemplary only, and the present invention may be used in conjunction with any of various systems, as desired. The system 100 includes a host computer 102 that connects to one or more instruments. The host computer 102 includes a CPU, a display screen, memory, and one or more input devices such as a mouse or keyboard as shown.

The computer 102 may execute a test executive sequence operable to analyze, measure, control, or otherwise test a unit under test (UUT) or process 150. For example, the test executive sequence may include various steps that invoke software test modules operable to connect through the one or more instruments to analyze, measure, or control the unit under test (UUT) or process 150. The software test modules that are invoked or called by the steps in the test executive sequence may include user-supplied code modules. In other words, the test modules may be written or supplied by a user of the test executive software.

The one or more instruments of the automated test system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the automated test system 100, as desired.

Figure 2:
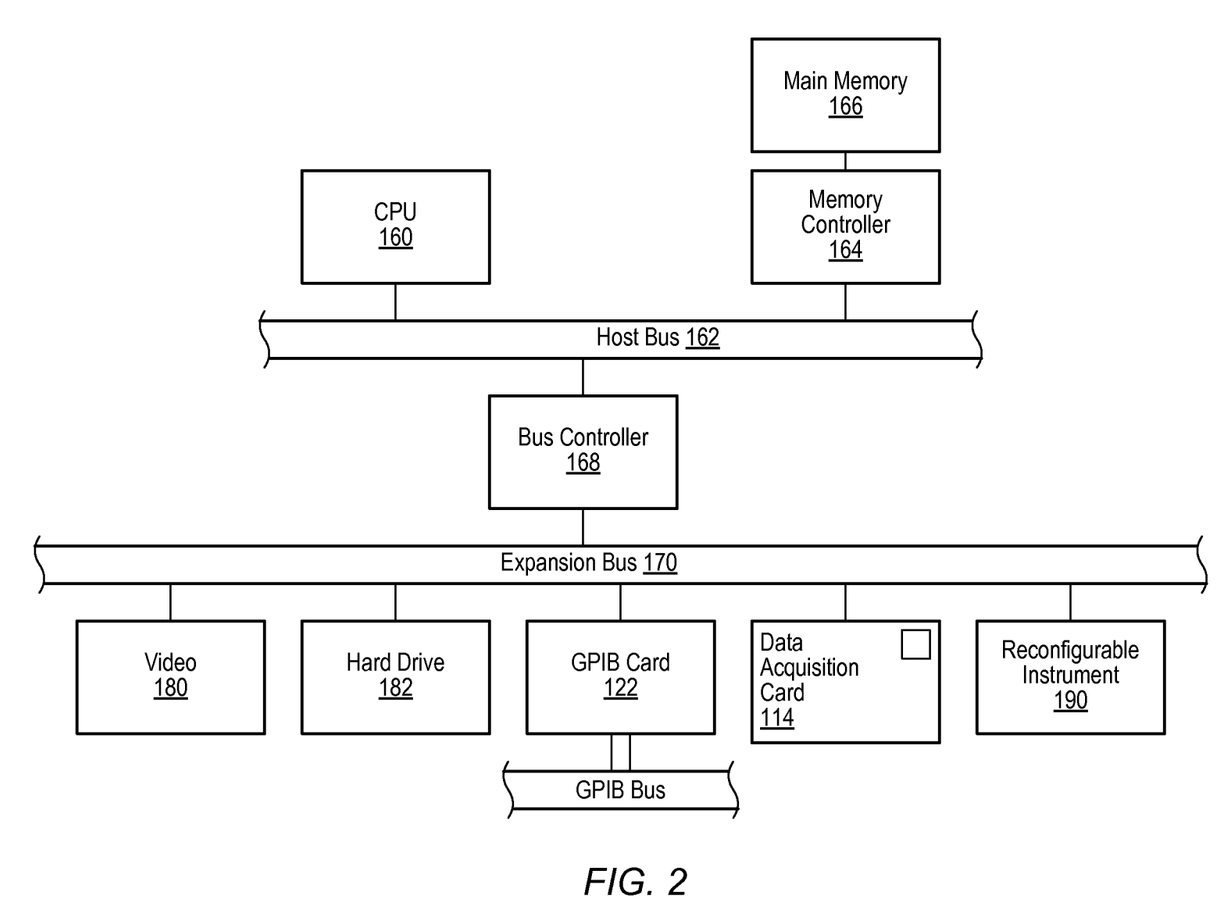
FIG. 2 is a diagram representing one embodiment of the computer system illustrated in FIG. 1.

FIG. 2 is a diagram of the computer system 102 illustrated in FIG. 1, according to one embodiment. It is noted that any type of computer system configuration or architecture may be used as desired, and FIG. 2 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

In the illustrated embodiment, the computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as the software elements described above with reference to FIG. 1. The main memory 166 may also store operating system software as well as other software for operation of the computer system, as well known to those skilled in the art. The CPU 160 executing code and data from the main memory 166 may include a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types may also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic element, e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Programmable Waveform

Figure 3:
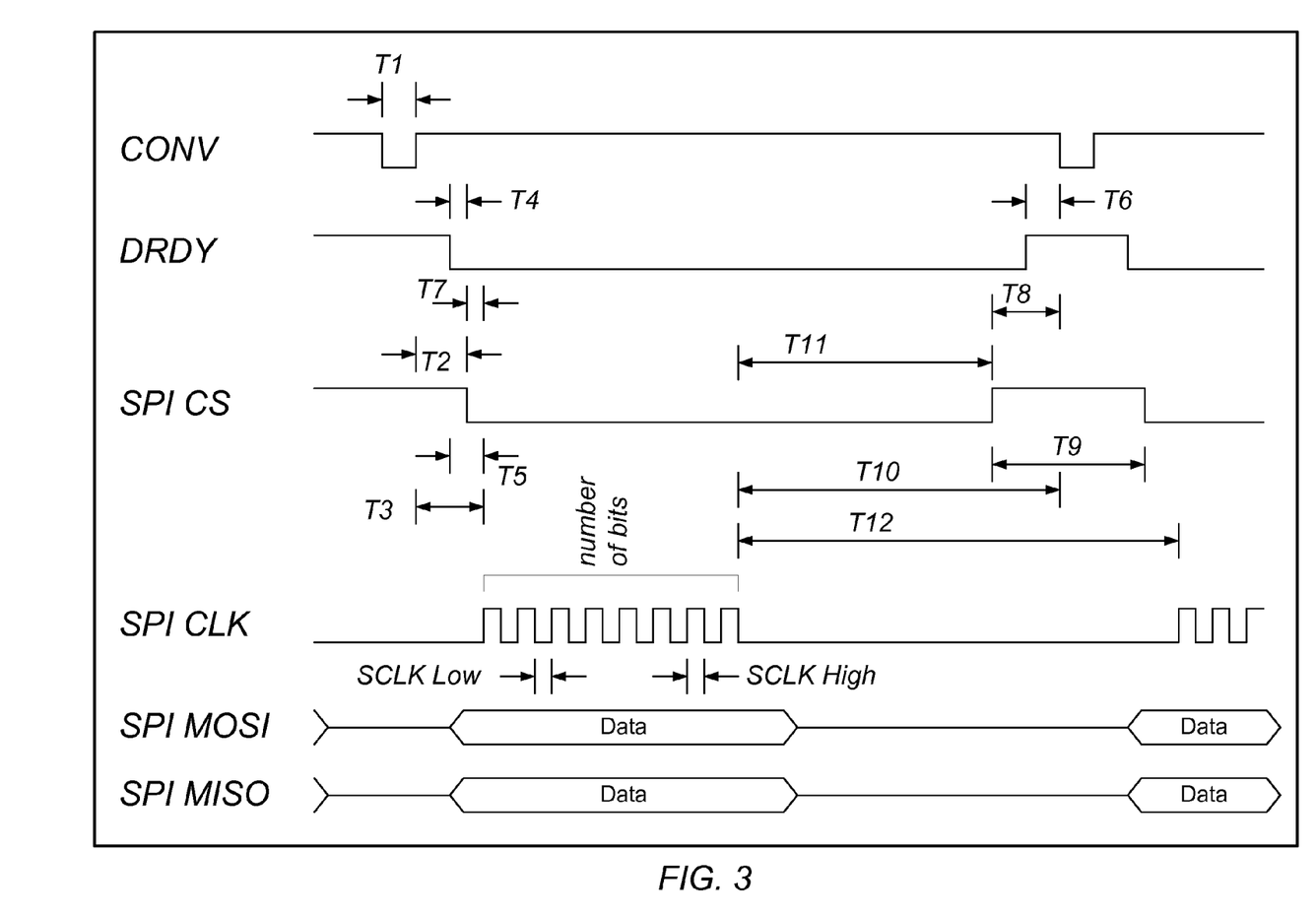
FIG. 3 illustrates a programmable waveform according to one embodiment.

Turning now to FIG. 3, one exemplary embodiment of a programmable waveform configurable for communication with a specified target device from a plurality of different target devices is shown. In the embodiment of FIG. 3, the target device may be one of a plurality of different analog to digital converters (ADCs). The programmable waveform of FIG. 3 includes waveform parameters and waveform lines. FIG. 3 illustrates waveform parameters that include: timing parameters (T1-T12), number of bits, SCLK Low, and SCLK High. The waveform of FIG. 3 includes six waveform lines. The CONV control line represents a signal that may be used to start an ADC conversion. The DRDY control line represents a signal that may be used by an ADC to indicate that a conversion is finished and/or that the conversion data is ready. The remaining waveform lines of FIG. 3 are lines for a serial peripheral interface (SPI): chip select (CS), clock (CLK), master-out-slave-in (MOSI) data, and master-in-slave-out (MISO) data. CS and CLK may be considered control lines, and MOSI and MISO data lines.

Other embodiments may include other types of communication interfaces instead of SPI or ADC lines. Yet other embodiments may use SPI and ADC lines in addition to other types of communication interfaces. For example, the Inter-Integrated Circuit (I²C) protocol may be used to communicate with ADCs. In such an embodiment, the I²C protocol lines could be used for data transfer in conjunction with control lines specific to an ADC model. In other embodiments, the configurable, programmable waveform may be used to establish communication with other target devices, such as digital to analog converters (DACs), electronically erasable programmable read-only memory (EEPROM) devices, and/or other devices and instruments. Varying target devices may require different interfaces and waveform parameters, and embodiments are contemplated in which any such parameters and interfaces may be configured using configurable, programmable waveforms.

The waveform parameters may include one or more of: setup time, hold time, lead time, trail time, idle time, clock frequency, clock duty cycle, number of data bits per transmission, number of data lines, pulse width, polarity, and phase for each waveform line. Setup and hold times may refer to time periods defined by specified points in time from an edge of another line, usually a clock line (an edge of a digital line refers to a change from low to high or high to low), during which data is expected to be clearly defined for proper data transmission. Lead and trail times may refer to a period of time between edges of different lines. Idle time may refer to a minimum or maximum time period during which a line is idle, and may be related to edges of other lines, or edges of the line itself. In FIG. 3, the clock frequency and clock duty cycle are specified by the high and low times of a control line acting as a clock (SCLK low and SCLK high parameters). The duty cycle may be adjusted in some communications interfaces such that the clock spends a greater portion of time in one state (i.e., high or low) than in the other. Devices may transfer different numbers of bits per transmission, so the number of bits may be configurable. In one embodiment, bits may be transferred on only the rising or falling edge of a clock. In other embodiments, data may be transferred on both clock edges. The data may be transferred in differing directions for different clock edges or the same direction regardless of clock edge. Target devices may use multiple data lines to transfer data in parallel, thus the number of data lines may also be configurable. Pulse width may refer to the length of a pulse on a line. The polarity of a line may indicate whether it is active when low or when high, and the phase of a line may indicate whether events should occur relative to an active edge (an edge in which the line is changing to the active state) or a passive edge of the line.

As illustrated in the exemplary embodiment of FIG. 3, T1 corresponds to the pulse width of a CONV line and T7 corresponds to a CS lead time. T11 corresponds to a CS trail time, T9 to a CS idle time, and the SCLK High and SCLK Low parameters to a clock hold time, a clock frequency and a clock duty cycle. Devices may only have specific requirements for a subset of the waveform parameters, in which case only the required parameters may be expected to be configured. These required parameters may be read from data sheets for target devices for achieving communication with the target device. If the parameters are incorrect, incorrect data may be read, or the edges of signals may be missed because they arrive too early. These errors may result in lost data, or a complete breakdown in communication. Other types of parameters may be used in other embodiments, and additional parameters may become necessary for new communication standards in the future.

Figure 4A:
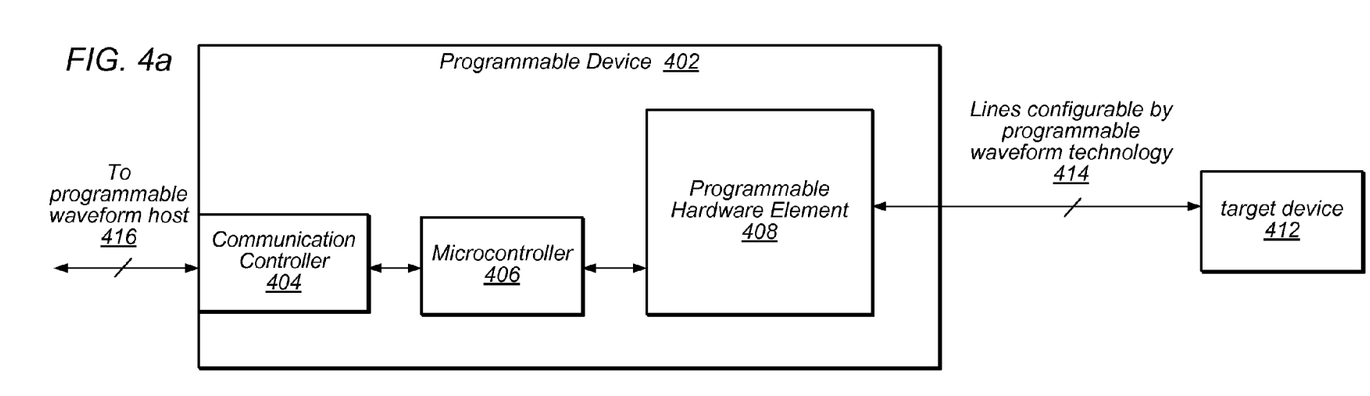
FIG. 4a is a diagram of a programmable device exemplary of one embodiment.

FIG. 4a illustrates one embodiment of a system for configuring a programmable waveform. A programmable device 402 is coupled to a host computer by communication lines 416 using a communication controller 404, wherein the host computer may be used to perform some of the steps of the following FIG. 4b flowchart for configuring the programmable waveform. The programmable waveform host may be a computer 102 as illustrated in FIG. 1, or any other type of computing device or system capable of executing software to configure a programmable waveform. In this embodiment, a microcontroller 406 and programmable hardware element 408 may be used to generate signals corresponding to the configured waveform lines on communication lines 414 connected to a target device 412. In other embodiments, the generation of these signals may be performed by hardware, software, or both. Hardware may include microcontrollers, processors, programmable hardware elements, or any other device or system capable of generating signals corresponding to a configured waveform. The target device 412 may be a unit under test (UUT) as previously described, or an instrument interfacing a UUT. The device or instrument may include an ADC.

Figure 4B:
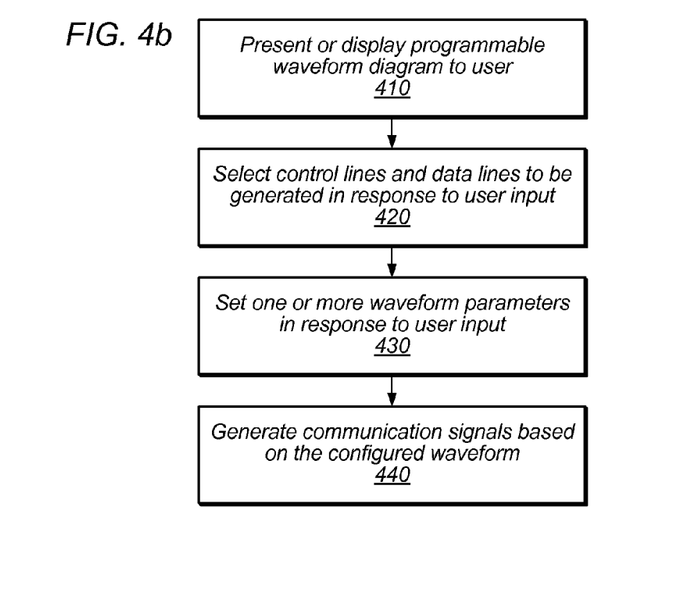
FIG. 4b illustrates one embodiment of a method for communicating with a target device using a programmable waveform.

FIG. 4b is a flowchart diagram illustrating one embodiment of a method for using a programmable waveform to communicate with a target device. In this embodiment, a programmable waveform is displayed or presented to the user (block 410), control lines and data lines are selected in response to user input (block 420), one or more waveform parameters are set in response to user input (block 430), and communication signals are generated based on the configured waveform (block 440).

The waveform presented to the user in block 410 may be displayed in a graphical user interface (GUI), provided in documentation, accessible on the internet, or otherwise available to the user. The waveform may include one or more waveform lines and one or more waveform parameters, such as those previously illustrated by FIG. 3. The waveform lines and parameters may be configured in order to match the required waveform configuration of a target device for communication with the target device.

A target device may not use or require all waveform lines that are available in a particular programmable waveform. In such a situation, the user may select only a subset of available waveform lines from the waveform to be configured and generated (block 420). In other embodiments the selection of control lines and data lines may be performed by selecting a target device from a database of devices to automatically configure which lines should be used. Various other methods for selecting and/or specifying data and control lines are contemplated.

In block 430, the user may set values for one or more parameters of the waveform to configure the waveform for communication with a target device. Examples of such parameters were shown in FIG. 3. As previously mentioned, parameters may be found in data sheets and timing diagrams for most devices, which should be readily available to the user of a target device.

The actions taken by the user (blocks 420 and 430) in the flowchart of FIG. 4b may be performed using a GUI on the computer system of FIG. 2 or any other type of computer system. Program instructions may reside in a memory medium on the computer system and may be executed by the CPU 160 in order to perform the functionality described. Based on this disclosure, the described functionality may be implemented on a variety of different systems.

Once the programmable waveform lines and parameters are configured, signals corresponding to the waveform may be generated to communicate with a target device (block 440). In one embodiment, a device such as the programmable device 402 of FIG. 4a may be configured to generate signals based on the configured waveform lines. The programmable device 402 may be coupled to a computer 102 used to configure the waveform parameters. In another embodiment, data or code may be generated corresponding to the configured waveform. The data or code may then be used to generate signals corresponding to the configured waveform for communication with a target device. For example, code may be generated to program a microcontroller or programmable hardware device, which may configure the microcontroller or programmable hardware device to generate signals corresponding to the configured waveform.

Figure 5A:
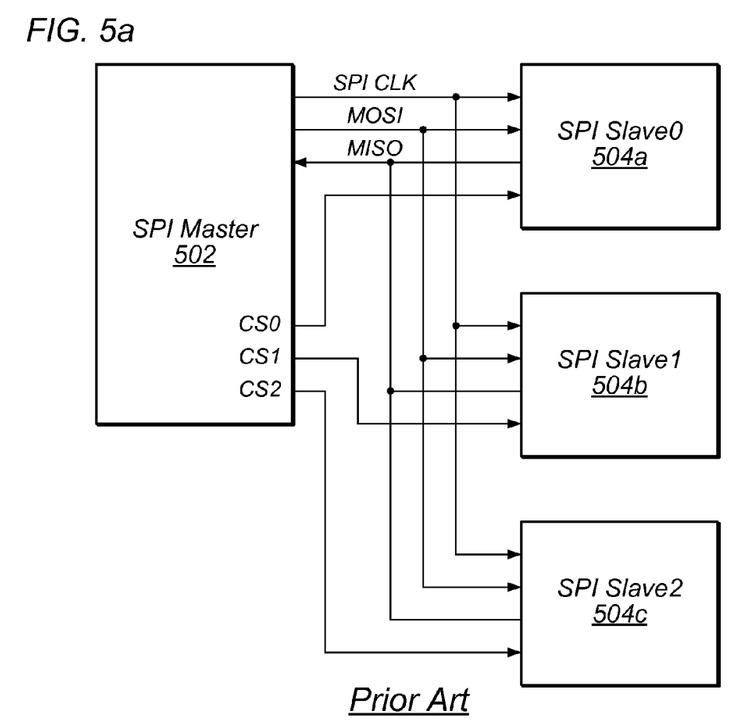
FIG. 5a is a prior art diagram of an SPI network.
Figure 5B:
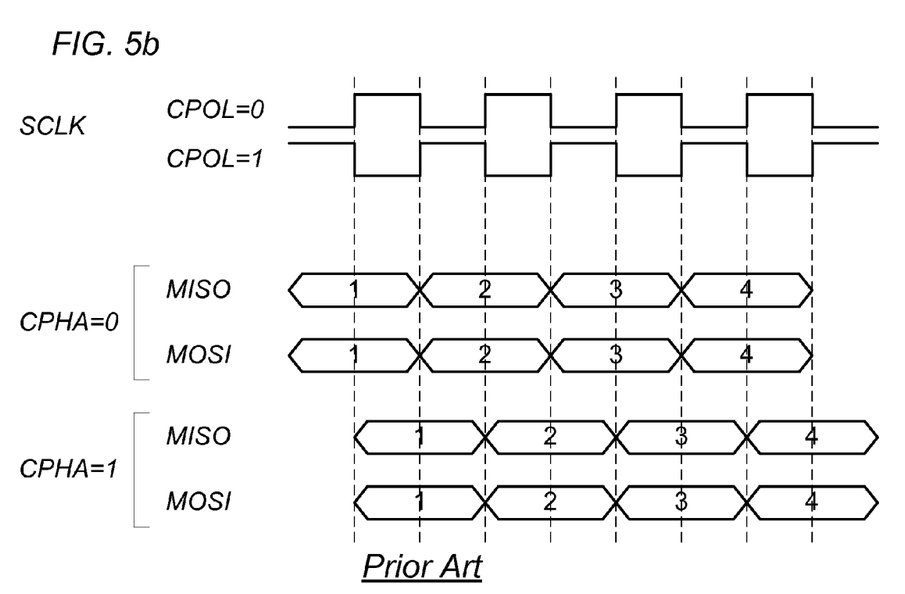
FIG. 5b is a prior art waveform demonstrating SPI modes.

One embodiment is directed specifically to serial peripheral interface (SPI)-based communication, as previously shown by the four SPI lines in the waveform of FIG. 3. It should be noted that there is no single standard for the SPI, therefore SPI devices often have differing configurations. FIG. 5a illustrates a simple exemplary SPI network, wherein an SPI master 502 is interfaced to communicate with three SPI slave devices 504a-c using the four SPI lines. FIG. 5b illustrates timing for four bits of data in the four SPI modes based on possible combinations of clock polarity and phase. These modes may be configured using the programmable waveform by setting the polarity and phase of the clock control line. Since different SPI devices use a varying number of bits per transmission, the "number of bits" parameter of FIG. 3 may be set to configure the number of data bits sent and received per SPI transfer. Some devices require a CS edge for every transmission even when using a single SPI master and single SPI slave, but if the device does not require a CS edge and it is the only device in an SPI network, then the SPI CS line may be disabled. In some embodiments, SPI devices may be configured to use only one data line and to clock data in two directions (on different clock edges). SPI devices may also use multiple data lines. These SPI parameters may be configured using a programmable waveform.

Figure 6:
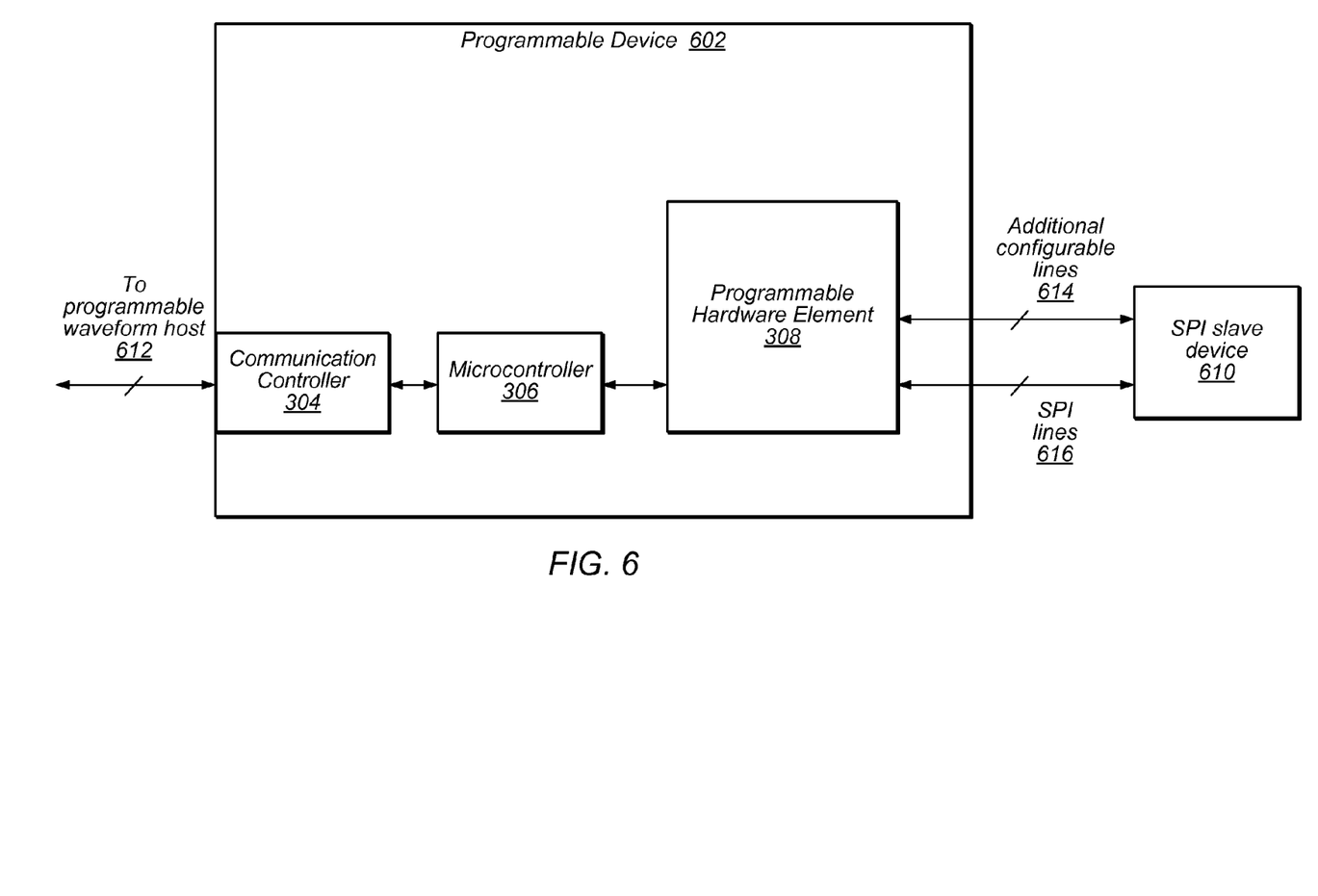
FIG. 6 is a specific embodiment of the device of FIG. 4a, including the SPI protocol.
Figure 7:
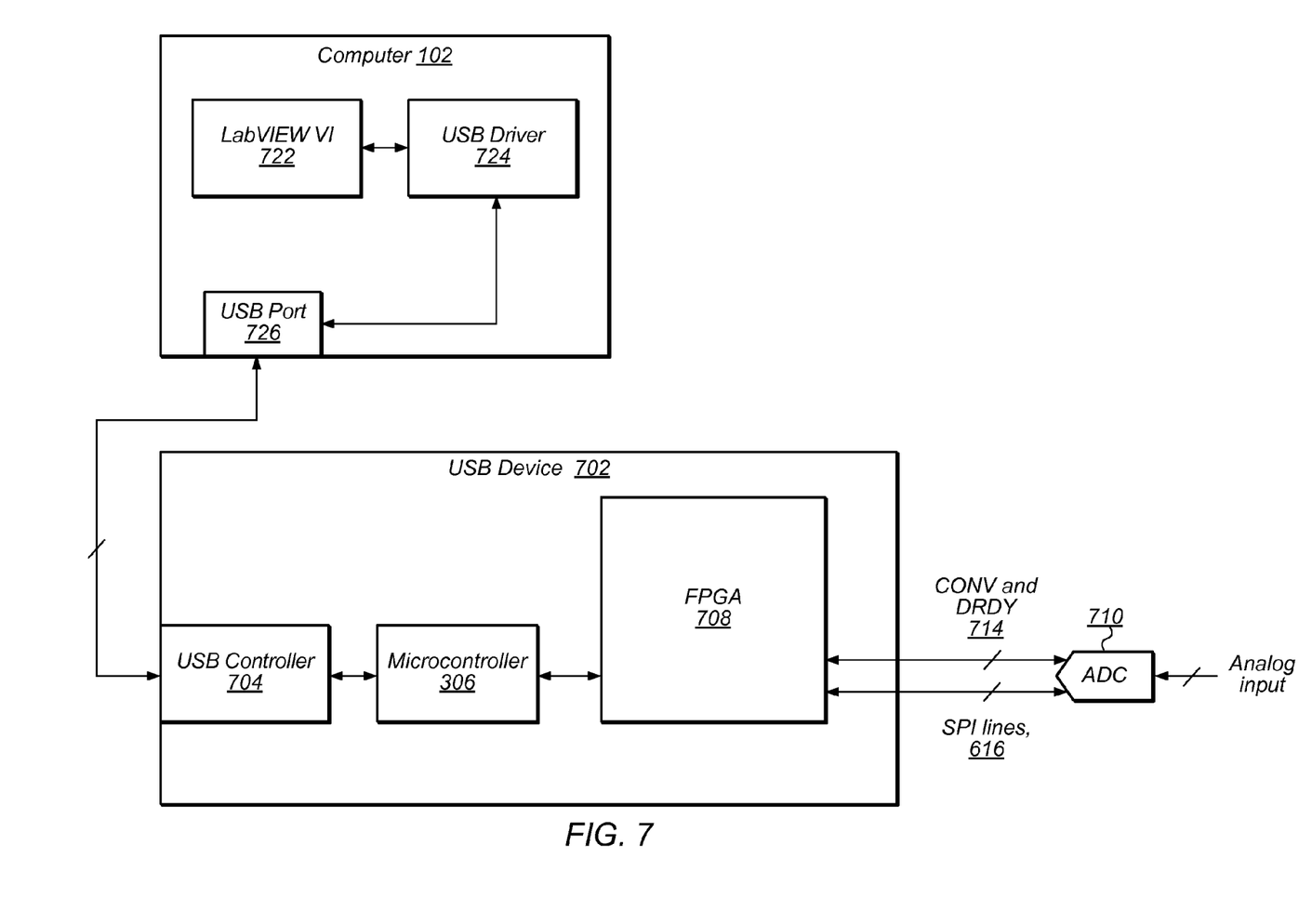
FIG. 7 is a specific embodiment of FIG. 6 wherein a programmable waveform is used to communicate with an ADC.

As previously discussed, some target devices may require specific timing parameters between other control lines and SPI lines. For example, FIG. 6 illustrates a more specific example of a target device 410 of FIG. 4a. In the embodiment of FIG. 6, a target SPI slave device 610 may use additional configurable lines 614 as well as SPI lines 616 in a communication interface. In other embodiments, the SPI lines may be replaced or augmented with Inter-Integrated Circuit (I²C) lines, Joint Test Action Group (JTAG) lines, or lines from another communication protocol. As shown in FIG. 7, the target device may be an analog to digital converter (ADC) 710, and the other control lines may include CONV and DRDY lines 714. In the embodiment of FIG. 7, several timing parameters of the programmable waveform correspond to timing constraints between SPI lines and CONV and DRDY lines.

As further shown in the embodiment of FIG. 7, the programmable waveform host may be a computer 102. In this embodiment, the GUI used to configure the programmable waveform is the GUI of the LabVIEW software program 722. The LabVIEW program 722 includes instructions executable by the CPU 160 which may be stored in Main Memory 166 and/or other memory media. The communication between the computer 102 and programmable device 702 includes a universal serial bus (USB) interface as illustrated in this embodiment by elements 724 (driver software), 726 (USB port), and 704 (USB controller on USB device). The USB port 726 may be coupled to the bus controller 168 of the computer 102. The programmable hardware element in the programmable USB device 702 is a field programmable gate array (FPGA) 708 in this embodiment. The microcontroller 306 uses a hardware configuration program generated by LabVIEW 722 in order to program the FPGA 708 to execute a state machine, and the state machine controls signals generated by the FPGA 708 according to the configured waveform lines. In this embodiment, the generated signals are used to trigger conversions on the ADC 710 and read data corresponding to those conversions using the SPI protocol. The specific embodiment of FIG. 7 is meant not meant to limit other embodiments to the specific devices or connectivity of FIG. 7.

Figure 8:
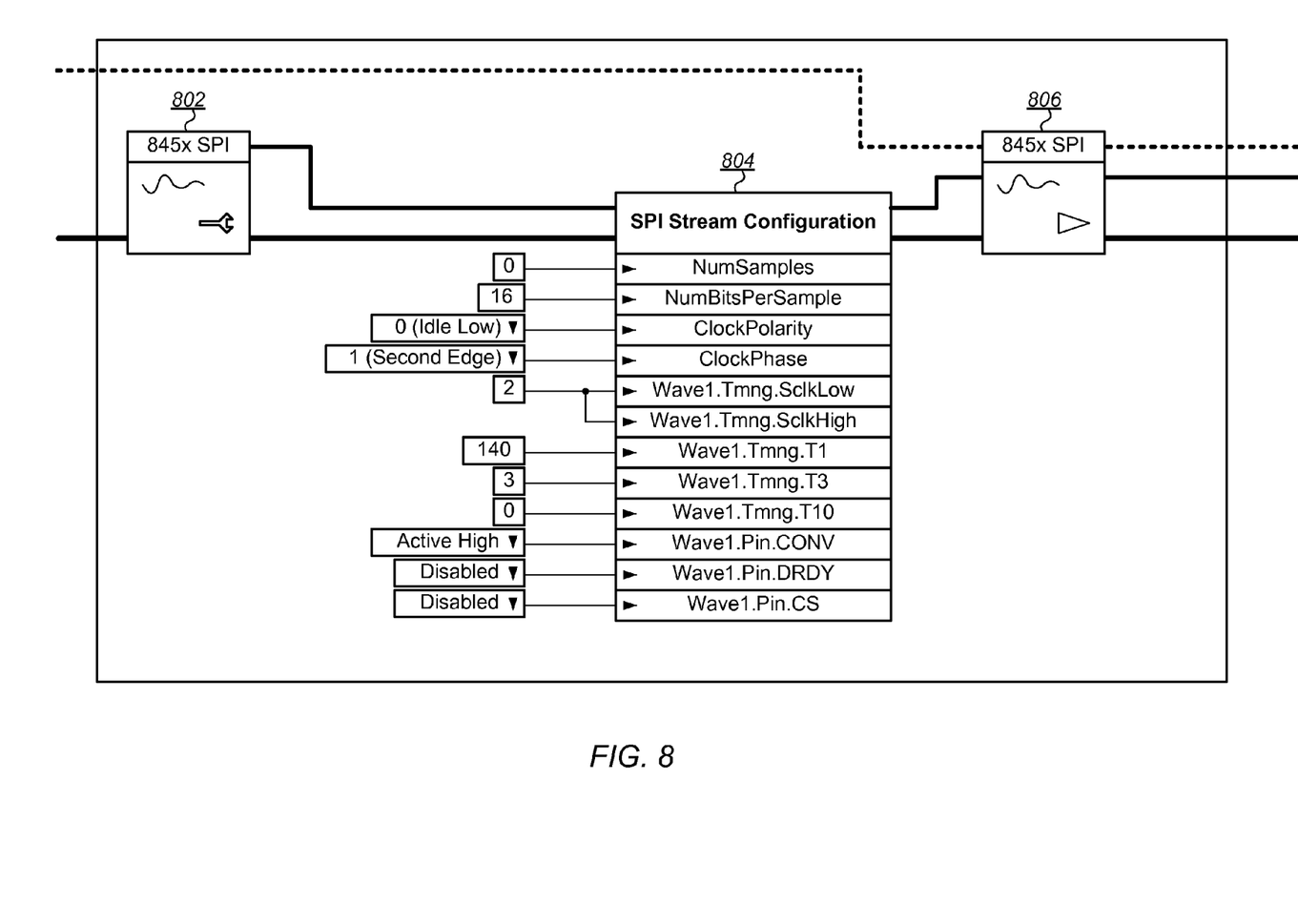
FIG. 8 is a diagram representing a GUI used to configure a programmable waveform to communicate with an ADC.

In some embodiments, waveform parameters may be set by clicking, typing, moving graphical elements, and/or other means convenient to the user. FIG. 8 is a diagram representing one embodiment of a GUI where the user has configured a programmable waveform for communication with a TI ADS8319 ADC. In one embodiment, the GUI is the LabVIEW GUI. In the embodiment of FIG. 8, block 802 indicates the function of creating an SPI Stream Configuration. Block 804 shows configured waveform parameters, and block 806 indicates the function of downloading and running the waveform. In this example, there are 16 bits per SPI transaction (NumBitsPerSample), the clock polarity is idle low, and the clock phase is set to the second clock edge. In this embodiment, timing parameters are given in 10 ns increments, and the T1, T3, T10, SclkLow and SclkHigh timing parameters are set (these parameters correspond to the waveform parameters of FIG. 3). The CONV line is active high, but in this example, the SPI CS line and the ADC DRDY line are not required and are disabled. This disabling is one embodiment of selecting waveform lines (block 420 of FIG. 4b). In the illustrated embodiment, downward arrows in some of the parameter blocks (such as the blocks coupled to ClockPolarity and ClockPhase) indicate that the parameter may be selected using the GUI from a drop-down list of available values.

In another embodiment, the user may utilize a GUI to configure waveform parameters by selecting a parameter within a displayed programmable waveform and then entering a value for that parameter. The displayed programmable waveform may have an appearance similar to the waveform of FIG. 3. Further embodiments are contemplated in which the displayed waveform may change appearance for various reasons. The appearance may correspond to the parameters set by the user. For example, the appearance of the waveform may change to accurately display the ratios of time intervals between line edges throughout the waveform. In other embodiments, waveform lines may change appearance when selected for use, and parameters may change appearance to indicate that the parameters have been assigned values, or that values still need to be assigned. In further embodiments, the waveform may change appearance to indicate errors in the configuration of the programmable waveform. Various embodiments are also contemplated for configuring waveform parameters, including text or code, graphical methods, gesture-based input, and/or other input methods.

Figure 9:
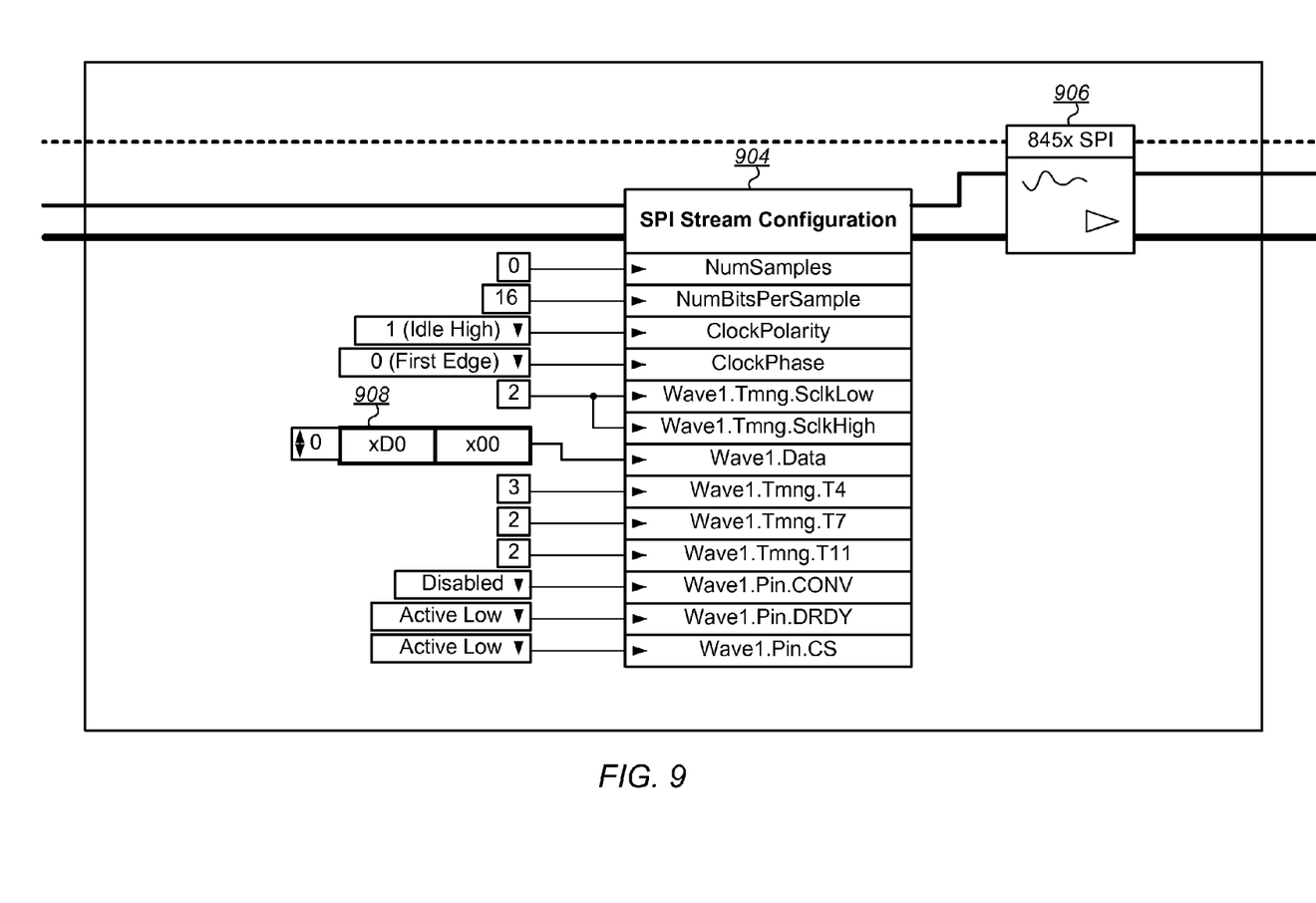
FIG. 9 is a diagram representing a GUI used to configure a programmable waveform to communicate with a second type of ADC.

FIG. 9 is a diagram showing the configuration of a waveform for a different target device, the TI ADS833x. The GUI represented is the same as presented in FIG. 8. As can be seen from a comparison of FIGS. 8 and 9, different devices may not require the same control lines or parameters. For example, the user in FIG. 9 disabled the CONV line, but used both DRDY and CS with active low polarity. The clock polarity and phase are both different from FIG. 8. The MOSI data 908 is 0xD000 (hexadecimal), which is a "read data" command for this particular ADC. The T4, T7, and T11 parameters were required to be greater than 25, 14, and 15 nanoseconds (ns) respectively based on the device data sheet. In this example, those parameters have been set to 30, 20, and 20 ns, since the timing was in increments of 10 ns.

Figure 10:
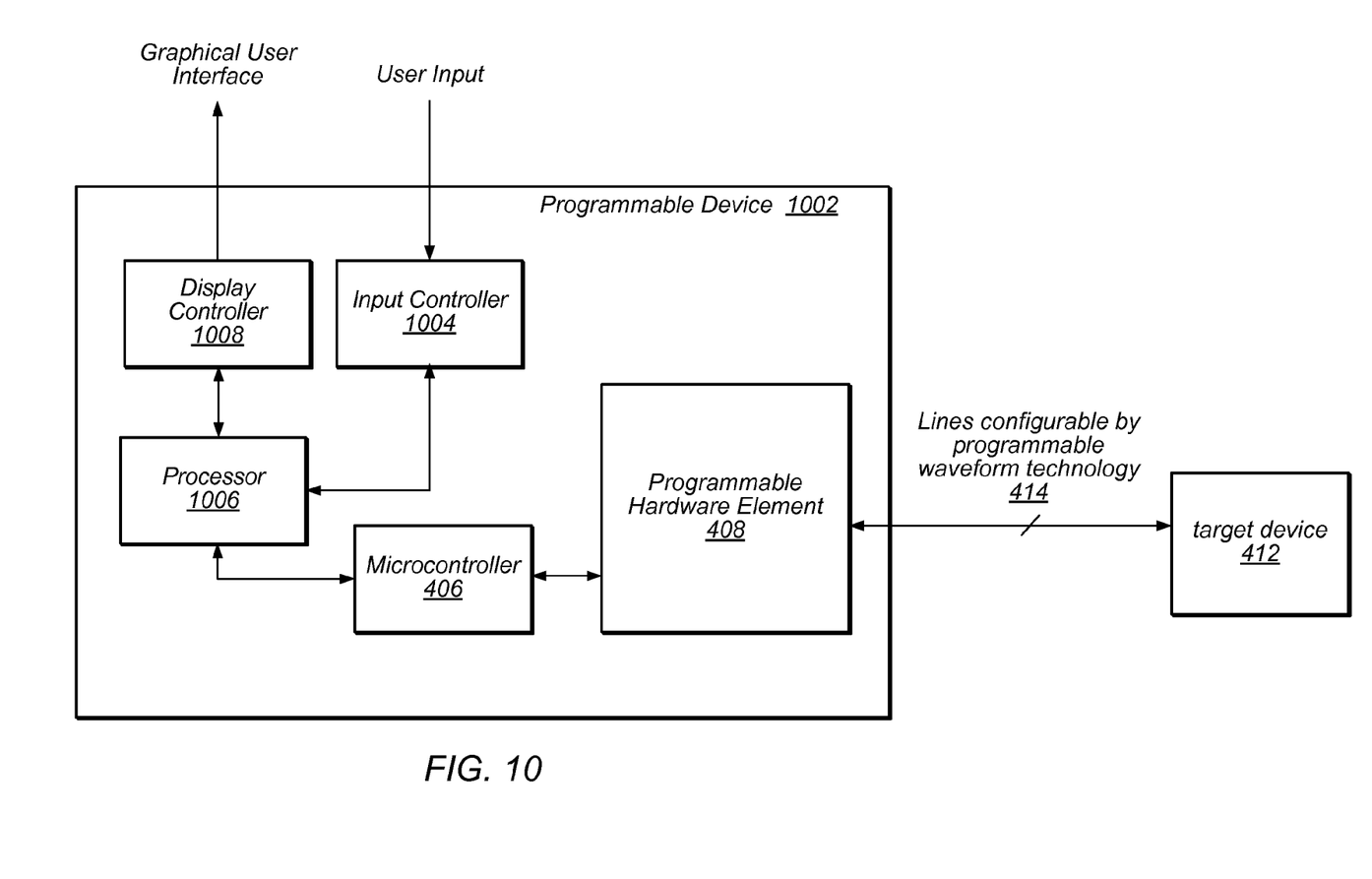
FIG. 10 illustrates an embodiment of an integrated programmable waveform system.

FIG. 10 illustrates an integrated computer system embodiment of a programmable waveform system, wherein the complete waveform configuration and signal generation is performed on a single device 1002. Display 1008 and user input 1004 are integrated on the single device. A processor 1006 on the device may execute program instructions to perform the methods previously described for programming a waveform. Other embodiments may utilize systems comprising multiple devices or a single device. As previously described, data or code may be generated based on configured waveform data. Using that generated data or code, a variety of systems or devices may be programmed for communication with a target device.

In the embodiments presented thus far, one programmable device may be configured to communicate with a target device, where the target device requires a certain communication protocol. However, in other embodiments, two or more devices in a communication network may be configurable using programmable waveform technology. Said another way, rather than configuring a waveform to meet requirements of a specific target device, a user may configure two or more programmable waveform devices in a communication network to use a desired communication configuration between the programmable waveform devices.

In one embodiment, a plurality of programmable waveforms may be provided to the user, corresponding to different device families, devices, and/or communication standards. In one embodiment, the user may select a desired programmable waveform from a database containing the plurality of waveforms before configuring the selected waveform. In other embodiments, users may specify additional programmable waveforms and upload them to a database accessible to other users.

In one embodiment, the configurable waveform may be checked for errors such as impossible timing constraints or other incorrect parameter values. This check may be performed during configuration of the waveform, or after the waveform is loaded and/or saved, but before the signals corresponding to the waveform are generated. Additional error checking may be performed during and after actual communication with a target device. In other embodiments, a GUI may be used to indicate errors and/or other events.

In further embodiments, a programmable waveform device may be capable of communicating with several target devices simultaneously, wherein the target devices may have the same or different waveform configurations.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring a programmable waveform for a communication interface, the method comprising:
setting one or more waveform parameters of the programmable waveform in response to user input specifying at least one of the one or more waveform parameters, to configure communication with a specified target device of a plurality of different target devices, wherein the programmable waveform comprises:
one or more waveform parameters; and
one or more waveform lines, that represent:
one or more control lines; and
one or more data lines; and
generating corresponding one or more signals based on at least a subset of the one or more waveform lines according to said setting, to communicate with the specified target device.

2. The method of claim 1, further comprising:
selecting the subset of the one or more waveform lines in response to user input.

3. The method of claim 1, wherein at least a specified number of the one or more waveform lines are configured as a serial peripheral interface (SPI); and
wherein the one or more waveform parameters include a clock polarity, a clock phase, and a number of data bits per transmission.

4. The method of claim 1, wherein one or more of the one or more control lines are configurable for communication with an analog to digital converter (ADC).

5. The method of claim 1, wherein the one or more waveform parameters comprise one or more of:
a setup time;
a hold time;
a lead time;
a trail time;
a clock frequency, for a control line configured as a clock signal;
a clock duty cycle;
an idle time;
a number of data bits per data transmission;
a number of data lines;
a pulse width;
a polarity, wherein the polarity indicates whether a waveform line is active when high or active when low; or
a phase, wherein the phase indicates whether events occur on rising or falling edges of a waveform line.

6. The method of claim 1, wherein said setting is performed using a graphical user interface (GUI) that includes a representation of the programmable waveform.

7. The method of claim 1, further comprising: changing an appearance of the representation in response to the user input specifying at least one of the one or more waveform parameters.

8. The method of claim 1, further comprising selecting the programmable waveform from a database of waveforms.

9. The method of claim 1, wherein a communication interface of the specified target device is configurable, wherein configuring of the communication interface is performed using a programmable waveform.

10. A memory medium storing programming instructions executable by a processor to implement configuring a programmable waveform for a communication interface, wherein the configuring comprises:
setting one or more waveform parameters of the programmable waveform in response to user input specifying at least one of the one or more waveform parameters, to configure communication with a specified target device of a plurality of different target devices, wherein the programmable waveform comprises:
one or more waveform parameters; and
one or more waveform lines, that represent:
one or more control lines; and
one or more data lines; and
generating waveform data corresponding to one or more signals based on at least a subset of the one or more waveform lines according to said setting, wherein the waveform data is useable by a device or controller to generate the one or more signals to communicate with the specified target device.

11. The memory medium of claim 10, wherein the configuring further comprises:
selecting the subset of the one or more waveform lines in response to user input.

12. The memory medium of claim 10, wherein the one or more waveform parameters comprise one or more of:
a setup time;
a hold time;
a lead time;
a trail time;
a clock frequency, for a control line configured as a clock signal;
a clock duty cycle;
an idle time;
a number of data bits per data transmission;
a number of data lines;
a pulse width;
a polarity, wherein the polarity indicates whether a waveform line is active when high or active when low; or
a phase, wherein the phase indicates whether events occur on rising or falling edges of a waveform line.

13. The memory medium of claim 10, wherein said setting is performed using a graphical user interface (GUI).

14. The memory medium of claim 10, wherein an appearance of a representation of the waveform displayed to a user changes in response to the user input setting the one or more waveform parameters.

15. The memory medium of claim 10, wherein the setting the one or more waveform parameters further comprises selecting the programmable waveform from a database of waveforms.

16. A system for configuring a programmable waveform for a communication interface, the system comprising:
a processor;
a programmable controller coupled to the processor; and
a memory medium coupled to the processor, wherein the memory medium stores programming instructions executable by the processor to:
set one or more waveform parameters of the programmable waveform in response to user input specifying at least one of the one or more waveform parameters, to configure communication with a specified target device of a plurality of different target devices, wherein the programmable waveform comprises:
one or more waveform parameters; and
one or more waveform lines, that represent:
one or more control lines; and
one or more data lines; and
configure the programmable controller to generate corresponding one or more signals based on at least a subset of the one or more waveform lines according to said setting, to communicate with the specified target device.

17. The system of claim 16, wherein at least a specified number of the one or more waveform lines are configured as a serial peripheral interface (SPI); and
wherein the one or more waveform parameters include a number of data bits per transmission and a number of data lines.

18. The system of claim 16, wherein the one or more waveform parameters include a pulse width.

19. The system of claim 16, wherein the programmable controller comprises a programmable hardware device and wherein the programming instructions are further executable by the processor to generate code for configuring the programmable hardware device to generate the corresponding one or more signals.

20. The system of claim 16, wherein the one or more waveform parameters
include a polarity, wherein the polarity indicates whether a waveform line is active when high or active when low.

* * * * *

UNITED STATES PATENT AND TRADEMARK OFFICE
CERTIFICATE OF CORRECTION

PATENT NO. : 8,639,853 B2  
APPLICATION NO. : 13/192989  
DATED : January 28, 2014  
INVENTOR(S) : Rathi et al.

Page 1 of 1

It is certified that error appears in the above-identified patent and that said Letters Patent is hereby corrected as shown below:

In the Claims:

Claim 7, Column 12, Line 38, please delete "claim 1" and substitute -- claim 6 --.

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,639,853 B2  
APPLICATION NO. : 13/192989  
DATED : January 28, 2014  
INVENTOR(S) : Rathi et al.

Page 1 of 1

It is certified that error appears in the above-identified patent and that said Letters Patent is hereby corrected as shown below:

On the Title page:

Item [73]
please delete "Intruments" and substitute -- Instruments --.

Signed and Sealed this
Tenth Day of February, 2015

Michelle K. Lee
*Deputy Director of the United States Patent and Trademark Office*